Sept. 20, 1966  M. BATOSTI ETAL  3,274,317
METHOD AND APPARATUS FOR EXTRUSION OF PLASTIC MATERIAL
Filed July 26, 1963  5 Sheets-Sheet 4

Inventors
MARIO BATOSTI
ANTONIO BELLONI
By William W. Stokes
Attorney

Sept. 20, 1966     M. BATOSTI ETAL     3,274,317
METHOD AND APPARATUS FOR EXTRUSION OF PLASTIC MATERIAL
Filed July 26, 1963     5 Sheets-Sheet 5
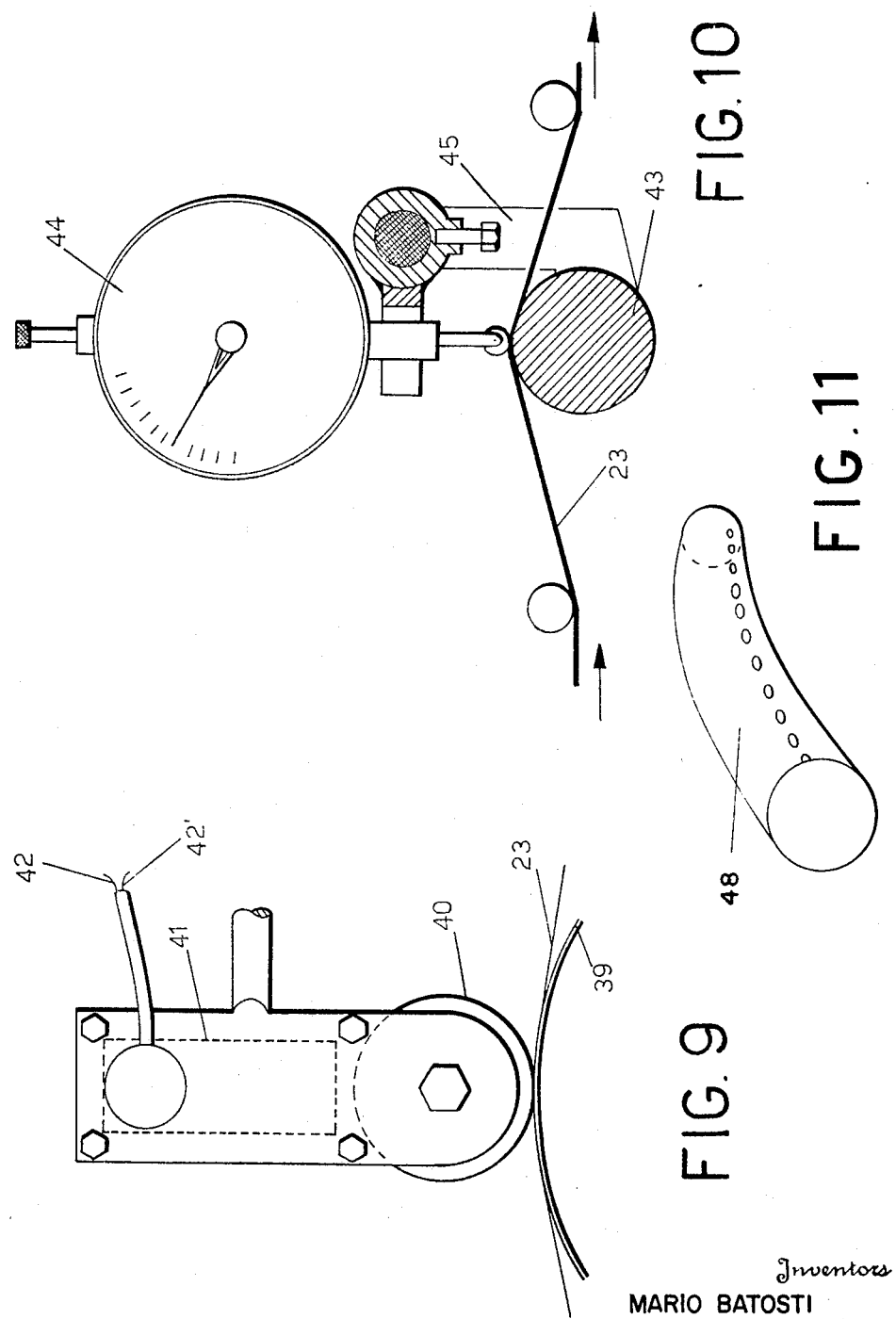
Inventors
MARIO BATOSTI
ANTONIO BELLONI
By William W. Stokes
Attorney United States Patent Office 3,274,317
Patented Sept. 20, 1966

3,274,317
METHOD AND APPARATUS FOR EXTRUSION
OF PLASTIC MATERIAL
Mario Batosti, Milan, and Antonio Belloni, Padova, Italy, assignors, by mesne assignments, to Edison, Milan, Italy, a corporation of Italy
Filed July 26, 1963, Ser. No. 297,876
11 Claims. (Cl. 264—95)

The present invention is directed to a system for extrusion of plastic material by blowing. More particularly, the invention is concerned with an improved method and apparatus for the extrusion of tubes of plastic material, for example, plastified polyvinylchloride, with and without fillers, of extremely precise tolerances.

In accordance with the invention, an improved method and apparatus is provided enabling the manufacture of tubes of plastic offering advantages heretofore unachievable by the methods and apparati known in the art. Among the advantages offered by the tubes manufactured in the process and apparatus of this invention are greater tear resistance, greater resistance to bursting, a high modulus of elasticity, maximum tensile strength, maximum elongation at break, low water vapor permeability, combustion resistant. These and other advantages enable, in turn, the simple and practical manufacture of relatively cheap products, for example, bags.

Specific examples of the outstanding properties of plastic tubes manufactured in accordance with this invention are as follows:

Resistance to tear above 6000 gr./mm. (ASTM D689)
Resistance to bursting above 2.3 kg./cm.$^2$ (ASTM D774)
Elastic modulus greater than 90 kg./cm.$^2$ (ASTM D882)
Maximum tensile strength at break above 170 kg./cm.$^2$ (ASTM D882)
Elongation at break above 220% (ASTM D882)
Permeability to water vapor less than 4.5 gr./cm.$^2$ 24h (ASTM E96)
Resistance to combustion, self extinguishing (ASTM D568)
Useful ambient temperature range from $-20°$ C. to $+50°$ C.

While the process and apparatus of this invention is adaptable for use with any of the extendable plastic materials for example, polyvinylchloride, polyethylene, polypropylene, polystyrene and the like, we have achieved outstanding results utilizing polyvinylchloride per se and filled with various suited filler materials.

In essence, the method of this invention provides a system for continuously manufacturing tubes of plastic material which comprises pumping heated plastic materials into a tube extrusion means driving said extrusion means with a variable speed motor, extruding the heated plastic material through a die plate means, with external circumferential undulations, externally cooling said tube extrusion means, expanding said extruded material into a tubular configuration with compressed air, flattening the expanded tubes, cooling the extruded material in two stages between the expanding operation and the flattening operation, additionally cooling the material during the flattening operation, subjecting the flattened tubes to a water bath, and winding the cooled flattened tubular material.

The apparatus of this invention comprises in combination a square-head extruder provided with die means comprising a plurality of circumferentially arranged protuberances on the external surface of the die, closed circuit cooling means located external to the extruder, blowing means for expanding the extruded tube, progressive cooling means arranged in series through which the blown material is passed, flattening chutes comprising hollow metal tubes through which water is passed, means for maintaining constant tension on the plastic material, during the extrusion stage and the flattening and winding and water bath means for the finished tubular material.

Another embodiment of this invention comprises hinged head means which facilitate the replacement of strainers.

Another embodiment comprises novel die means which comprises an at least partially circumferential undulated surface of such a form as to cause an increase of uniform compression towards the terminal part of the extrusion die, to the end that the thickness of the extruded film be uniform; being said undulations projecting outwardly into the path of the material being extruded. It is another embodiment of this invention which comprises printing means, which may be associated, if desired, with the flattening means, for imprinting, for example, legends, trademarks, instructions, etc. on the tubes at spaced intervals. This invention also provides an apparatus which may be used in the combination which removes noxious vapours which are harmful to workers generated during the extrusion process and which facilitate the tackiness of the walls of the tube during the flattening and winding stages.

For a better understanding of the improved method and apparatus of this invention, reference is now made to the drawings in which:

FIGURE 1 is a schematic illustration of the improved system of this invention showing the arrangement of elements.

FIGURE 2 a plan view of an embodiment of this invention comprising a novel hinge means for the extruder head.

FIGURE 9 depicts an embodiment of this invention whereby the flattened tubes may be imprinted during continuous production.

FIGURE 10 shows in detail, a side view of the means in accordance with this invention, for continuously measuring the thickness of the flattened tubes to constantly insure the double thickness thereof.

FIGURE 11 shows in a perspective view a portion of cooling means of the invention.

With reference to the drawings wherein like parts have been designated by the same numerals, the extruder designated by numeral 46 is provided with a variable speed motor 47, which transmits the smallest sensitive variations within the range of operational speed of the extruder. Numerous types of extruders may be satisfactorily utilized in the method and combination of this invention, for example, a single or multiple screw extruder, or a normal or horizontal head extruder. In the preferred embodiment, an extruder having a single screw and with normal head, more particularly with a square head die, is used.

Figure 1:
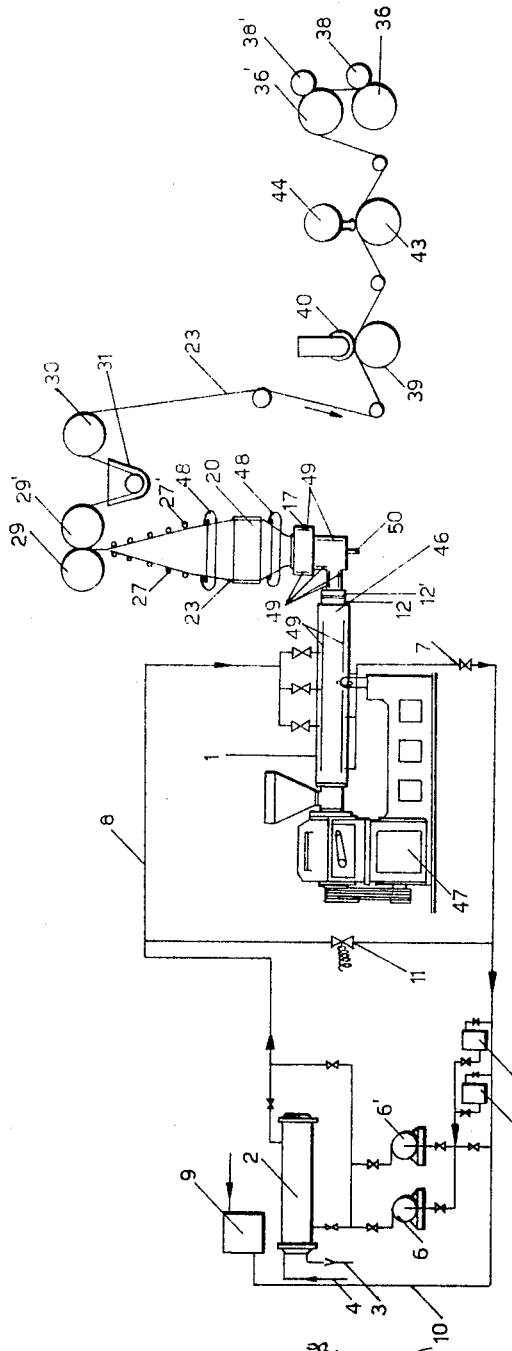

With particular reference to FIGURE 1, the extruder is provided with a closed circuit cooling system utilizing the oil as the heat exchange means. The cooling circuit comprises an external jacket 1 substantially covering the entire length of the extruder 46. The cooling circuit further comprises water cooler 2 having an inlet 4 and outlet 3. Hot oil flowing out of cooling jacket 1 goes through pipe 7 through a filter 5 from whence it is pumped via pump 6 through cooler 2 and thence out conduit 8 returning to flow through the peripheral cavities of jacket 1. Filter 5' and pump 6' are illustrative of auxiliary units which may be used during the cleaning of main filter 5 and pump 6 to alleviate any necessity of closing down the system for cleaning of the pump and filter means.

Tank 9 serves to restore the oil through pipe 10; 11 represents a discharge valve.

This closed circuit is set in such a way as to allow to the cooling oil a thermal gradient of not more than 30°/40° C., so as to ensure gradual temperature variations of the whole body of the extruder without sudden changes.

Figures 2, 3:
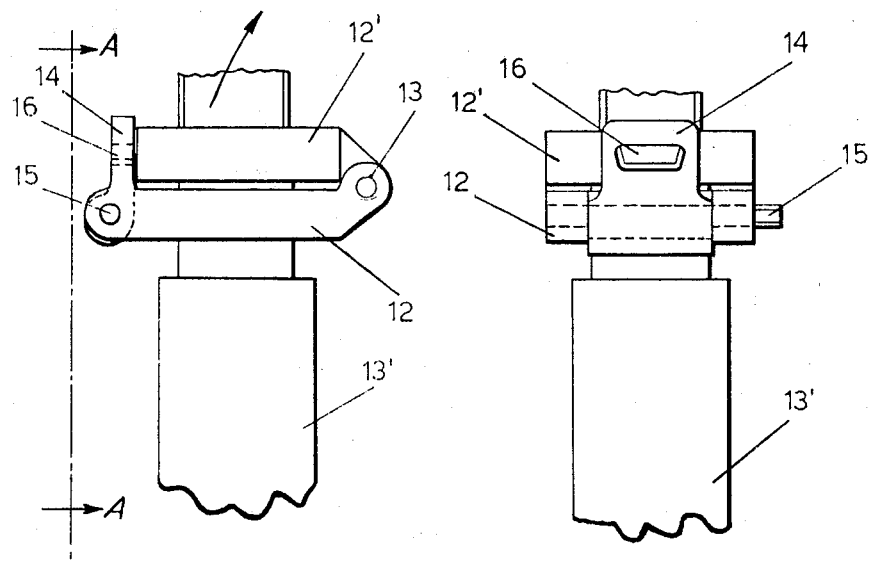
FIGURE 3 is a view partly in section of the hinge means of FIGURE 2 taken along line A—A.

Dependent upon the particular type of compound used and the filler added to it to make it more economical, it is required, as is quite well known, that filters have to be inserted before the extrusion head to remove any foreign particles, such filters, generally having 32 meshes/cm.$^2$, require regular cleanings and very frequent replacements. For this purpose the extruder according to the invention is fitted with a special hinge (FIGURES 2 and 3) which contrary to the conventional system by which the extruder head is directly bolted to the body of the extruder itself, allows the opening of the filter zone by the simple rotation of a pivot.

This hinge consists of plates 12 and 12' hinged together at 13 and locked by a swivel hook 14 which rotates around an eccentric pivot 15; this swivel hook 14 has an eyelet which engages with locked hinge, a fixed pin 16 projecting from the movable plate 12'.

The simple turning of the eccentric pivot 15 allows the hook 14 to disengage itself from pin 16, wherefore the moving part on which the extrusion head is mounted, by rotating on pivot 13, allows the filters to be removed from the extruder 13'; in this way the replacement of these filters can be effected very rapidly thus involving only a short down-time period in the operational cycle of the extruder.

Also the extrusion head (FIGURE 4) has been improved according to the invention by making use of the already known motion of the distribution of the material flow through four feeding canals so as to distribute the material in the possibly most regular and uniform way; the extruding head itself is fitted in the external surface of the die with a series of elements suited for creating a pressure increase towards the end of the extruding head, always with the object of obtaining the most uniform possible distribution of said fluid threads.

Figure 4:
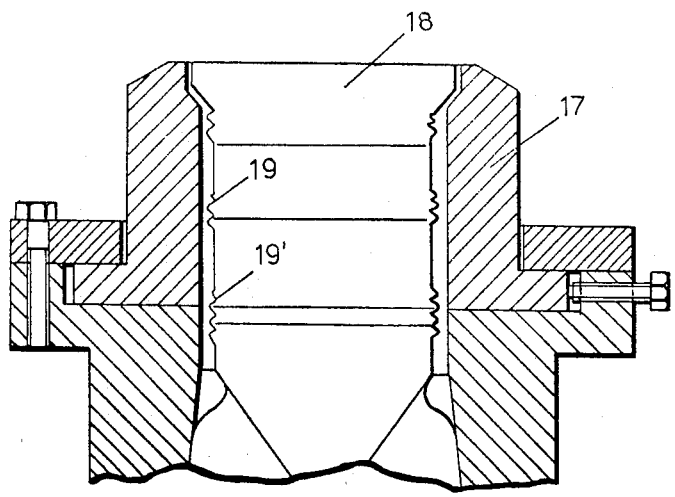
FIGURE 4 is a longitudinal cross sectional view of an extrusion head with the improved die means of the invention.

In fact, as shown in FIGURE 4 the extruding head 17 has in its interior a die 18, the external surface of which, instead of being uniformly cylindrical, has a series of undulations 19, 19' etc., suitable, in practice, for uniformly increasing the compression towards the end of the head as previously explained, avoiding deformations and localized stretchings of the extruded tube.

Further to those improvements, an operational temperature of the head in relation to that of the extruding chamber is foreseen, such as will result in a temperature jump from the last part of the extruder's end to the extruding head, so as to obtain excellent thicknesses of the extruded tube, such temperature jump being obtained by means of a series of electric heating resistances 49 (FIGURE 1) suitably distributed between extruding head and extrusion chamber.

Figure 5:
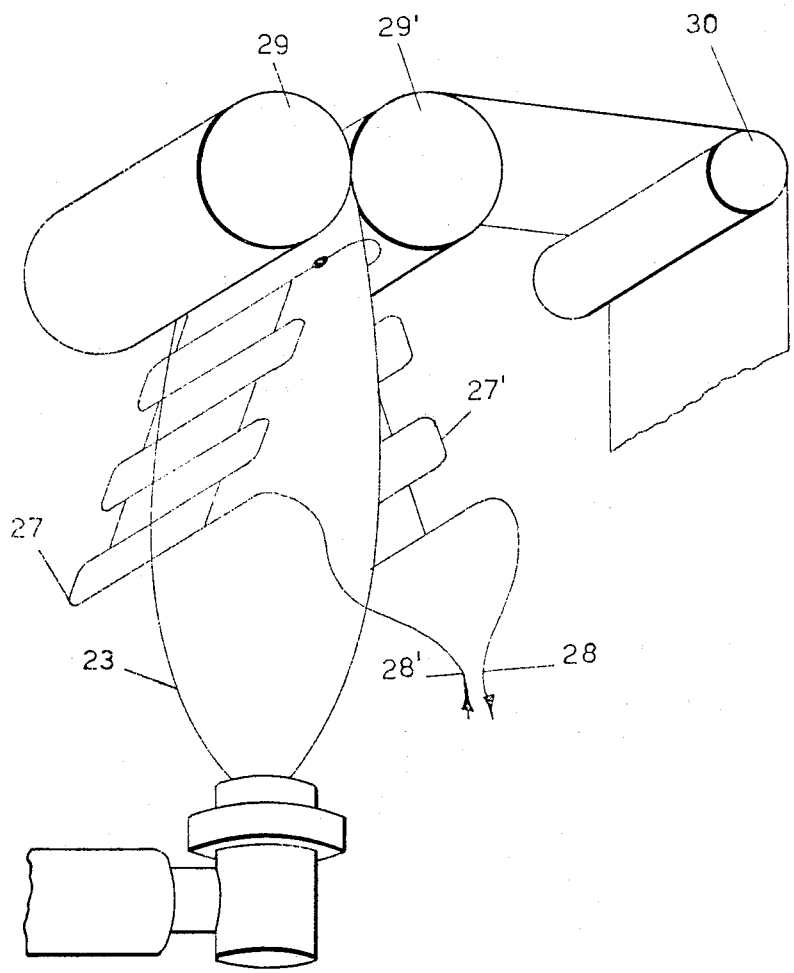
FIGURE 5 illustrates schematically in perspective the flattening chutes of the invention.

At the outlet of the extrusion head (see FIGURE 5) the tube is blown up to the required diameter by blowing into it compressed air through a channel 50 (FIGURE 1); since it is indispensable to maintain the tension on the body of the tube as uniform as possible, according to the invention, a cooling system has been provided that has two separate stages, of which the first is located on the tube immediately after the stretching so as to cool down the fluid mass from 160° to 110° C., the second one is located somewhere before the flattening and conveyor chutes.

Those cooling stages (see FIGURE 11), indicated also in FIGURE 1 by numerals 48 consist of annular bodies, coaxial to the tube, inside of which air under pressure is circulated which is then blown through holes distributed continuously on the annular bodies, into the external surface of the tube being extruded. Through the second cooling stage the temperature of the tube is brought down to about 60° C.

Since the compound used usually allows the presence in it of plasticizers which may cause evaporation phenomena during the extrusion with formation of vapours noxious or at least troublesome to the operator, which vapours also facilitate the tackiness of the walls of the tube obtained, the installation has been fitted according to the invention, with a special suction system for these vapours, suited for eliminating the usual air conditioning and air exchange installations in the working rooms.

Figure 6:
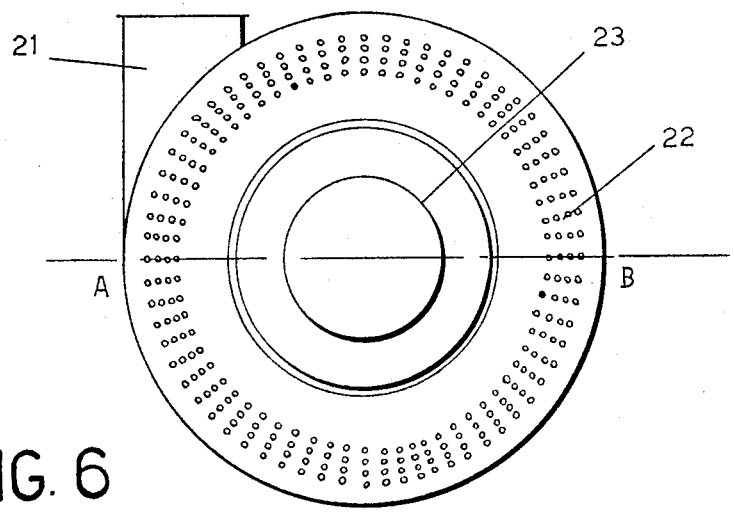
FIGURES 6 and 7 show in a sectional and side view respectively another embodiment of the invention comprising a vapour exhausting suction means of this invention.
Figure 7:
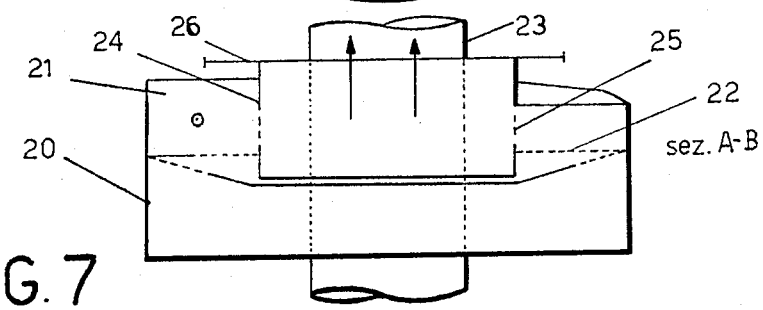

The vapour exhaustion system consists (see FIGURES 6 and 7) of a cylindrical hollow body 20 having a suction orifice 21, inside which is placed a diaphragm 22 with a perforated surface in order to allow the vapours continuously evaporating from the tube 23 to be sucked out and exhausted to the exterior. Axially to the cylindrical body 20 is placed another cylindrical body 24 having a diameter smaller than that of the former, the cylindrical surface of which is peripherally perforated as shown by 25 in FIG. 7. Inside the cylindrical body 24 there passes the tube 23, around which and immediately at the outlet of it from the cylindrical body 24, a disc 26 is mounted interchangeably so as to make it suitable for any diameter of the extruder tube.

The function of that device consists in causing a suction through the holes 22 as well as through the perforated surface 25, while the interchangeable disc 26, by stopping the vapours eventually drawn to the outside of the cylindrical body 24, causes these vapours to re-enter the cylindrical body 20 causing them to be sucked in through the suction orifice 21.

This vapour exhaustion system is preferably located between the said cooling stages in the zone near the extrusion head as indicated in FIGURE 1 by numeral 20, where, for the existing temperature, there are more concentrated vapours.

Still with the object to properly cool the extruded tube, this latter (FIGURE 5) is further made to pass through flattening chutes cooled by water.

Chutes 27 and 27' are realized, according to the invention, by means of metal pipes inside of which is circulated cooling water; 28 and 28' represent schematically respectively the outlet and inlet for the cooling water to circulate through the chutes. Tube 23, after having passed through chutes 27 and 27', is flattened down by flattening rollers 29 and 29', it then passes over a guide roller 30 and is finally wound up, as will be more clearly explained further on.

The particular embodiment of cooled flattening chutes prevents the eventual migration of the plasticizers present in the starting compound which migration manifests itself by exhibiting tackiness of the wall inside of the tube particularly during the flattening operation rollers 29 and 29'.

In addition, because the material is still slightly warm at the delivery side of the flattening rollers 29 and 29' (see FIGURE 8), the material often exhibits tackiness during the winding operation. In order to prevent this tackiness and also stretchings by winding, the dragging system for the flattened tube 23 is fitted with an additional cooling system consisting of a water bath 31 trough into which the tube 23 passes before reaching the guide roller 30. It is possible with this embodiment to maintain the thermal drop of the tube, between the inlet and the outlet of the trough, within from about 25° to 30° C.

Figure 8:
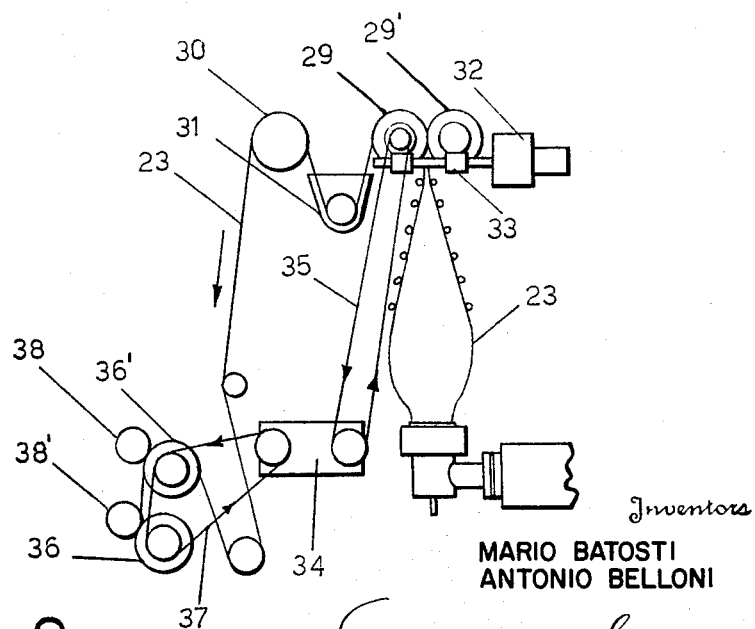
FIGURE 8 shows, schematically, the synchronized draw-off means of this invention.

Referring to FIGURE 8, the dragging system and winding up system, in the combination of this invention, for the tube is different from any such system heretofore known in the art. This system consists of a synchronized elastic connection system which allows the maintenance of constant tension on the tube during the extrusion end winding stages. The method of dragging consists in subjecting rollers 29 and 29' to a motor speed variator 32 driving said rollers through worm screws 33 and a variator gear box 34 connected to the motor speed variator 32 by a driving chain or belt 35. Finally, the variator gear box 34 drives winding rollers 36 and 36' through a second chain 37. Because of our novel dragging system it is possible to synchronize the rotational speed of rollers 29 and 29' with that of rollers 36 and 36' so as to ensure a constant tension on the tube being extruded and wound. The winding of the tube on the spools 38 and 38' is effected by a direct contact of said taking up spools with the drag rollers 36 and 36'; in this way stretching due to the progressive winding of the coils is avoided. As a matter of fact, said stretchings would cause, as a consequence of the elasticity of the material, shrinkage during the unwinding and transformation of the tube into containers or bags.

Still according to the invention, in combination with the dragging system of FIGURE 8, a direct hot printing for marking the tubular during the winding stage, is also contemplated.

This imprinting permits the provision on the tube of a trademark, the name of the firm and all other data suitable for identifying the extruder, working shifts or the like. Such hot printing system consists of a roller 39 on which cylindrical surface all the words and markings to be impressed on the tube are realized in relief; the flattened tube 23 slides on roller 39 (FIGURE 9) against which it is constantly kept by heated roller 40 which is fitted with an electrical resistance heating system 41.

42 and 42' represent the electrical supply cables.

The part of roller 39 carrying said marking types is, according to the invention, interchangeable so that it can be replaced daily or at pre-established intervals.

A system for the automatic control of the thickness of the tube during the extrusion is also provided in connection with the aforementioned dragging system. This system (FIGURE 10) is realized by subjecting the flattened tube 23, which slides on a fixed support 43, to the action of the plunger of a feeler gauge 44, adjustably supported by bracket 45 and capable of measuring continuously the dual thickness of the flattened tube.

Obviously, various substitutions of specific control and regulation elements utilized in the method and apparatus of the invention may be made with other technically equivalent elements. It is to be understood, however, that such substitutions and modifications fall within the scope of the present invention.

We claim:
1. The method of manufacturing tubular plastic material which comprises pumping a heat liquified plastic material into an extrusion means with a variable speed motor, extruding the heated plastic material through a die plate means, with external circumferential undulations, externally cooling said extrusion means, expanding said extruded material into a tubular configuration by blowing said extruded material with compressed air, flattening the expanded tube, cooling the extruded material in two separate stages subsequent to the blowing operation and prior to the flattening operation, additionally cooling the tube material during the flattening operation and subsequently subjecting the tube material to a water bath followed by winding said tube on spools.

2. The method of claim 1 wherein the plastic material to be extruded is polyvinylchloride.

3. The method of claim 1 wherein the plastic material to be extruded is polyvinylchloride to which has been added a filler.

4. The method of claim 1 wherein the initial cooling stage of the extruded material subsequent to the blowing operation lowers the temperature of the extruded material from about 160° C to about 110° C. and the second cooling stage prior to flattening lowers the temperature to about 60° C.

5. The method of claim 1 wherein the temperature of the tubular material is reduced in the water bath by about 25°–30° C.

6. A system for the production of tubes of plastic material comprising in combination:
 (a) extruder means,
 (b) external cooling means for said extruder,
 (c) extruding head means,
 (d) a die means mounted within said extruding head means comprising an at least partially circumferential undulated surface, being said undulations projecting outwardly into the path of the material being extruded,
 (e) means for expanding the extruded material to form a tubular configuration,
 (f) flattening means for flattening said expanded material,
 (g) two stage cooling means for the extruded material arranged between said expanding and said flattening means,
 (h) flattening chute means comprising water cooling means,
 (i) water bath means for said flattened tube material to reduce the temperature of said tube by about 25° and 30° C.,
 (j) winding means for winding said tubes upon spools.

7. The system of claim 6 wherein said extruding head means are hingedly mounted on said extruder, said head being provided with an eccentric pivot locking and unlocking means.

8. The system of claim 6 wherein said external cooling means for said extruder comprises a jacket for said extruder, said jacket containing a plurality of peripheral cavities through which a cooling liquid is circulated and means for withdrawing the circulated cooling liquid, lowering the temperature thereof and recyling the cooled liquid to said jacket.

9. The system of claim 6 wherein said two stage cooling means comprises at least one pair of conduit cooling members arranged coaxially and externally with respect to the extruded tube material, said cooling members having a plurality of openings through which air under pressure is blown onto the external surface of the extruded material.

10. The system of claim 6 wherein said flattening and winding means are driven by synchronized kinematic means to effect constant tension on the tube material.

11. The system of claim 6 wherein said winding means comprises printing means for imprinting words, symbols and the like on the tube material, simultaneously with the winding operation.

References Cited by the Examiner

UNITED STATES PATENTS 3,194,864   7/1965   Richie _____ 264—95 X
3,221,370   12/1965  Corbett _____ 18—14

FOREIGN PATENTS 215,146   10/1957   Australia.

ROBERT F. WHITE, *Primary Examiner.*

A. R. NOE, *Assistant Examiner.*